United States Patent
Lohmann et al.

(10) Patent No.: US 7,325,655 B2
(45) Date of Patent: Feb. 5, 2008

(54) STEERING ARM FOR A WALKING/RIDER PALLET TRUCK

(75) Inventors: Helmut Lohmann, Nartum-Gyhum (DE); Matthias Roder, Hamburg (DE)

(73) Assignee: Jungheinrich Aktiengesellschaft, Hamburg (DE)

( * ) Notice: Subject to any disclaimer, the term of this patent is extended or adjusted under 35 U.S.C. 154(b) by 552 days.

(21) Appl. No.: 10/916,676

(22) Filed: Aug. 12, 2004

(65) Prior Publication Data

US 2006/0032695 A1 Feb. 16, 2006

(51) Int. Cl.
*B66F 9/075* (2006.01)

(52) U.S. Cl. .................. 187/231; 187/222; 180/315

(58) Field of Classification Search ........... 180/19.1, 180/315, 318, 320, 323, 324, 78, 332, 336; 280/771, 47.34, 47.36, 47.371, 79.11; 74/144, 74/491; 187/231, 222
See application file for complete search history.

(56) References Cited

U.S. PATENT DOCUMENTS

| | | | | |
|---|---|---|---|---|
| 5,033,326 A | * | 7/1991 | Powell et al. .............. 74/551.4 |
| D364,029 S | * | 11/1995 | Noonan et al. .............. D34/35 |
| 5,595,259 A | * | 1/1997 | Gilliland et al. ............ 180/332 |
| D408,769 S | * | 4/1999 | Gilliland et al. ........... D12/174 |
| 5,964,313 A | * | 10/1999 | Guy ........................... 180/332 |
| D450,417 S | * | 11/2001 | Pulskamp et al. ........... D34/35 |
| 6,382,359 B1 | | 5/2002 | Lohmann ..................... 187/231 |
| 6,464,025 B1 | * | 10/2002 | Koeper et al. ............. 180/19.2 |
| D519,706 S | * | 4/2006 | Witt et al. .................... D34/35 |
| 2004/0099453 A1 | * | 5/2004 | Guy ........................... 180/65.1 |
| 2006/0032695 A1 | * | 2/2006 | Lohmann et al. ........... 180/315 |
| 2006/0231301 A1 | * | 10/2006 | Rose et al. ................. 180/19.1 |
| 2006/0231302 A1 | * | 10/2006 | Rose .......................... 180/19.3 |
| 2006/0245866 A1 | * | 11/2006 | Rose et al. .................. 414/392 |

* cited by examiner

*Primary Examiner*—Eric Culbreth
*Assistant Examiner*—K J A
(74) *Attorney, Agent, or Firm*—Marjama & Bilinski LLP

(57) ABSTRACT

A steering arm for a walking/rider pallet truck, the truck having a housing with an upper side and the steering arm having a steering rod which is linked to the upper side of the housing with one end, and carries a steering head at the other end. The steering head includes actuation elements for the control of functions of the pallet truck, the steering rod having an upper surface and lateral surfaces which join to the upper surface, at least the lateral surfaces being covered by a cushion.

11 Claims, 3 Drawing Sheets

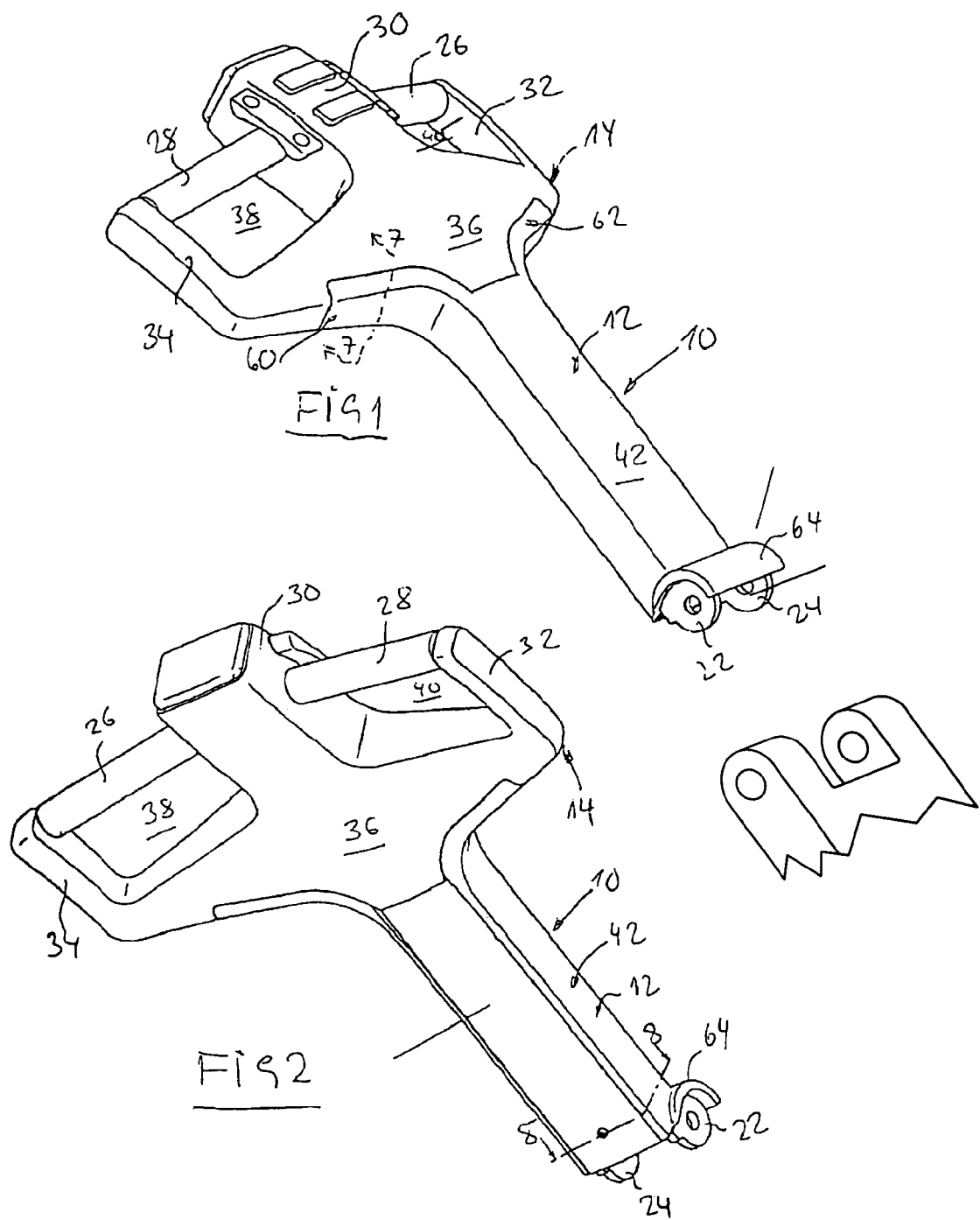

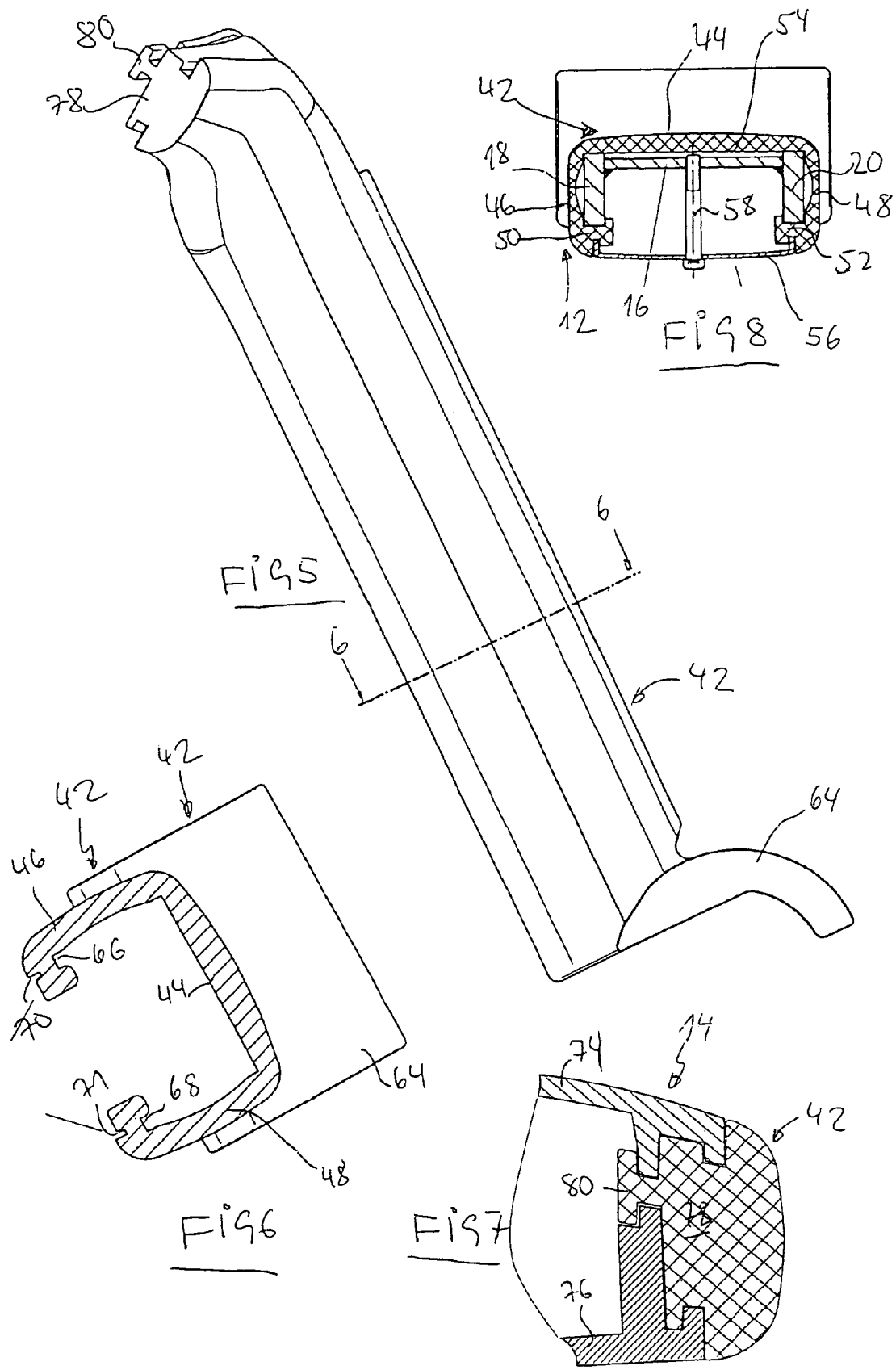

STEERING ARM FOR A WALKING/RIDER PALLET TRUCK

FIELD OF THE INVENTION

Background of the Invention

The invention refers to a steering arm for walking/rider pallet truck.

There exists a kind of pallet truck which is steered by a steering arm or pole. A subspecies is a walking pallet truck where the operator grips the steering arm and handles the pallet truck by drawing or pushing the arm. Another subspecies refers to a pallet truck wherein the operator stands on a platform of the truck and actuates the steering arm. It is understood that the steering arm for the rider type is shorter than that for the exclusive walking type. In the first case, the steering arm is pivotally supported on the upper side of a housing part of the pallet truck.

The general structure of a steering arm for a pallet truck is that a steering rod is linked to the pallet truck or a steering shaft, respectively, and carries a steering head. The steering head includes gripping portions which are to be engaged by the operator and actuation elements for the control of functions of the pallet truck, e.g. of the driving motor, the brake or the lifting cylinder for the load supporting means. Conventional embodiments for the steering head have a similar structure. It is symmetrical to the longitudinal axis of the steering arm. A central horn extends as an elongation of the steering rod into the steering head, and gripping portions are located on both sides of the horn which extend transverse to the steering rod, the gripping portion with the outer ends being connected to leg portions. The leg portions are connected to a transverse portion which is attached to the steering rod. By this on both sides of the horn portion gripping openings are formed.

Finally, it is known to design the pallet trucks for the walking and rider operation as well. If designed for the rider operation the truck can serve as commission pallet truck. If load carriers are to be loaded or unloaded pallet trucks designed for the walking operation are preferred. In trucks for the rider operation the operator stands on a platform and engages with one hand a holding bail. The other hand engages a gripping portion of the steering head and thus controls the steering arm. Such a pallet truck has become known by U.S. Pat. No. 6,382,359 B1. In particular in standing operation considerable steering forces are necessary. To support the steering operation it is known that the operator frequently uses his thigh. With his thigh he presses against the steering rod which usually is of metal. Such operation frequently is uncomfortable.

SUMMARY OF THE INVENTION

It is an object of the invention to provide a steering arm for a walking/rider pallet truck such that the steering support by the thigh of the is less uncomfortable if compared with conventional trucks.

In the invention at least the lateral surfaces of the steering rod are provided with a cushion. According to an embodiment of the invention such a cushion can be directly foamed onto the rod or tube of the steering arm. However, also separate cushion portions or pads can be manufactured to be attached to the surfaces of the steering rod. It is particularly preferable to provide an integrally molded portion which is mounted to the steering arm in a suitable member.

A cushion layer on the steering arm which may extend into the steering head has a plurality of advantages. The supporting actuation of the steering rod by the thigh of operator is more comfortable. The operator feels this as a reduction of the pressure feeling on his thigh. When using the pallet truck in a cold storage depot the cushion as an insulating effect relative to the steering arm which usually is made of metal and thus attains the cold of the cold storage depot. A further advantage of a molded cushion is that the outer shape of the steering arm can be designed with an optimum appearance, e.g. by spherical shapes, other parting lines for the components, scarred surfaces or the like. Finally, the advantage is achieved that the steering rod can be manufactured with low expense since the rod is not visible from exterior.

While the steering rod in conventional pallet trucks has a circular or rectangular cross section an embodiment of the invention provides that the steering rod is U-shaped in cross section. The cushion portion can be U-shaped or C-shaped in cross section and adapted to the profile of the steering rod. It is understood that suitable means are to be provided to retain the cushion safely at the steering rod. To this purpose a cover plate is provided which is attached to the lower side of the steering rod through threaded connections. The cover plate clamps both portions of the C-shaped cushion portion tightly against the steering rod which undergrip the steering rod from below. By this the cushion is positively attached to the steering arm.

For the purpose of appearance and also for a positive attachment the molded cushion portion may extend into the steering head. Therefore, according to a further embodiment of the invention the molded cushion portion has two leg portions extending laterally at the upper end. The leg portions extend cup-like in cross sections towards the steering head. The leg portions engage the front surfaces of the steering head on both sides of the steering rod, preferably such that the outer surfaces thereof are in the same plane as the remaining surface portions of the front side of the steering head. It is conventional to compose such steering heads of a lower and an upper shell or cup, the shells for example being interconnected by screws of the like. In such embodiment lower and upper edge portions of the shells may engage accordingly formed grooves of the leg portions of the molded cushion portion in order to fix them to the steering head.

BRIEF DESCRIPTION OF THE DRAWINGS

An embodiment is hereinafter explained along accompanying drawings which show:

FIG. 1 is a diagrammatic view of a steering arm according to the invention from above, FIG. 2 is a diagrammatic view of the steering arm of FIG. 1 from below FIG. 5 is a lateral view of the cushion portion of FIGS. 3 or 4, FIG. 6 is a cross section through the illustration of FIG. 4 taken along line 6-6, FIG. 7 is a cross section through the illustration of FIG. 1 taken along line 7-7, and FIG. 8 is a cross section through the illustration of FIG. 2 taken along line 8-8.

DETAILED DESCRIPTION

Figure 3:
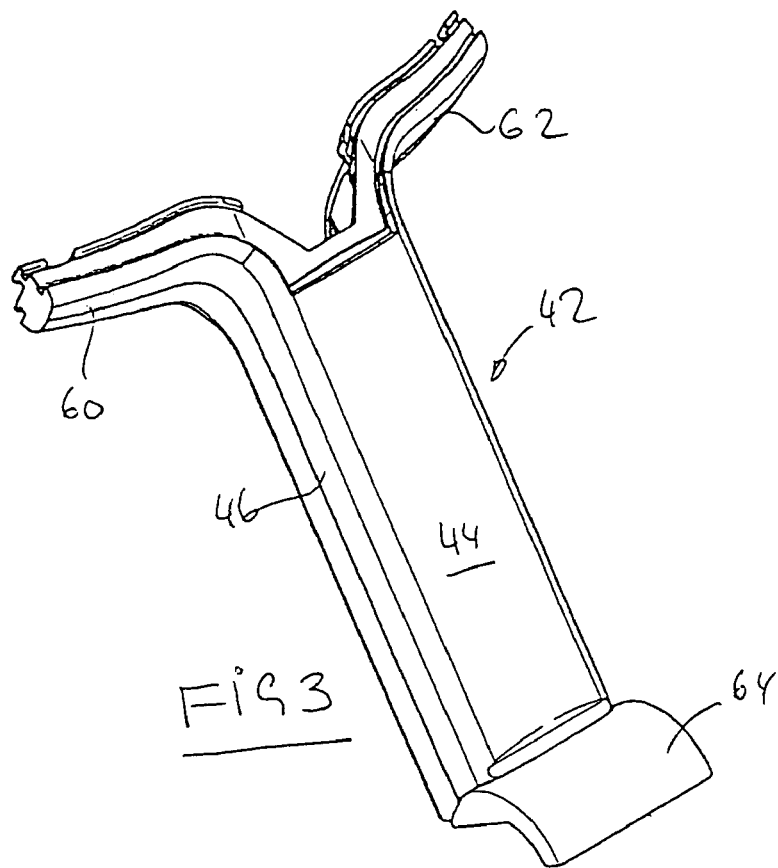
FIG. 3 is a diagrammatic view on a cushion portion for the steering arm of FIG. 1 from above.

In FIGS. 1 and 2 a steering arm 10 is depicted which has a structure generally known. As to this it is for example referred to the U.S. Pat. No. 6,382,359 B1. In this document a typical pallet truck for the walking/rider operation is shown which has a steering arm with a basic structure to which also the present invention refers. Therefore, it is expressly referred to this prior art.

As can be seen in FIGS. 1 and 2 the steering arm 10 has a steering rod 12 and a steering head 14. The structure of the steering rod 12 can be clearly seen in FIG. 8. It has a U-shaped profile with a web plate 16 and leg portions 18, 20. The mentioned parts are attached to each other by welding. The shown U-profile at the end has two laterally spaced bearing eyes 22, 24. The bearing eyes are provided for the mounting of a steering arm to a vertical steering shaft of a pallet truck not shown. By this the steering arm 10 can be pivoted about a horizontal axis and contemporarily rotate about a vertical axis in order to effect a steering motion.

As can be seen further in FIGS. 1 and 2 the steering head 14 has two gripping portions 26, 28 on both sides of a horn portion 30. The gripping portion 26, 28 at the outer ends are connected to leg portions 32, 34 which in turn are connected to a transverse portion 36. The transverse portion 36 is attached to the steering rod 12. The horn is centrally attached to the transverse portion and extends beyond the gripping portions 26, 28. Such design is conventional and is not to be explained further in detail. As can be seen the described parts of the steering head 14 form two gripping openings 38, 40. Individual actuation elements are provided on the steering head 14 for the control of functions of the pallet truck not shown. This is also not to be described in detail.

From FIGS. 1, 2 and 8 it can be seen that the steering rod 12 or the U-shaped profile of the steering rod shown in FIG. 8 is embraced by a cushion portion 42. As can be seen in FIG. 8, the cushion portion 42 is C-shaped in cross section. A web portion 44 faces the web plate 16 and covers the web plate, leg portions 46, 48 extend approximately parallel to the leg portions 18, 20 and lower portions 50, 52 undergrip the leg portions 18, 20, with grooves in the portions, 50, 52 accommodate lower edges of the leg portions 18, 20. An intermediate space 54 is formed between the web portion 44 and the web portion 16 in FIG. 8. It results from the fact that the leg portions 18, 20 somewhat protrude beyond the web plate 16. A further intermediate space is provided between the leg portions 46, 48 on one side and the associated sides of the leg portions 18, 20 on the other side. By this the cushion portion 42 which may be made of a suitable elastomeric cushion material, e.g. plastic foam, can be deformed inwardly upon a pressure thereon.

As can be seen further in FIG. 8 a relatively thin cover plate 56 is provided which has a U-shaped profile in cross section by bent edges which engage corresponding grooves of portions 50, 52 of the cushion portion 42. By means of screws one of which is shown at 58 the cover plate 56 can be attached to web plate 16. This attachment secures the cushion portion 42 to the steering rod 12 in that it prevents the leg portions 18, 20 from disengagement with the associated grooves of portions 50, 52.

Figure 4:
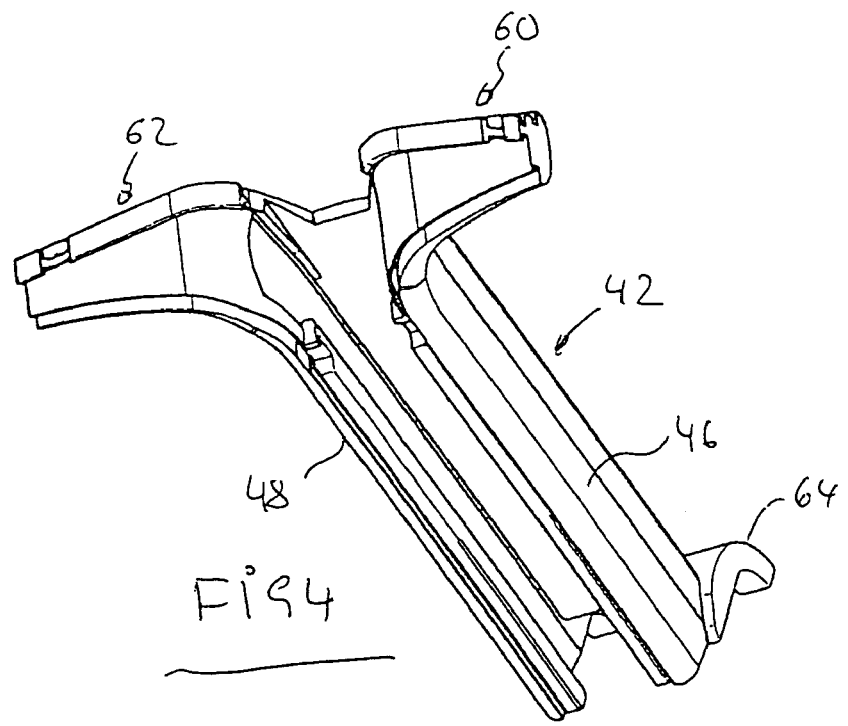
FIG. 4 is a diagrammatic view on the cushion portion of FIG. 3 from below.

The basic structure of the cushion portion 42 is shown in FIGS. 3 and 4. It can be seen that at the upper end thereof curved legs 60, 62 extend laterally away from each other. The legs 60, 62 engage the associated front curved surfaces of steering head 14 as shown in FIGS. 1 and 2. The mounting of the legs 60, 62 to the steering head 14 is described hereinafter in more detail.

An arcuately shaped portion 64 is provided at the other end of the cushion portion 42 as can be seen in FIGS. 3 and 4. The portion 64 extends upwardly beyond the web portion 44. At the lower side it is adapted to the shape of the bearing eyes 22, 24 and engages the bearing eyes at the associated side as can be seen in FIGS. 1 and 2. Thus, the cushion portion 42 at the lower end is supported by the steering rod 12.

FIG. 6 shows a cross section of the cushion portion 42 in the range of the steering rod 12. The grooves which according to FIG. 8 accommodate the leg portions 18, 20 are designated with 66, 68. The grooves which accommodate the edges of the cover plate 57 are designated with 70, 71.

It can be seen in FIG. 7 that the housing of the steering head 14 is composed of an upper cup portion 74 and a lower cup portion 76. The separation line which is defined by the cup portions 74, 76 are not shown in FIG. 1 and 2. The upper cup portion 74 is made of plastic material and the lower of aluminum.

As can be seen FIG. 7, the legs 60, 62 have a specific cross sectional profile with a first T-profile 78 and a second T-profile 80, The associated edge portions of the cup portions 74, 76 are shaped complementarily so that it may engage the grooves formed by the T-profiles 78, 80 on opposing sides. Thereby the legs 60, 62 are positively retained by the housing of steering head 14.

It should be mentioned with respect to FIGS. 1 and 2 that the legs 60, 62 are attached to the cup portions 74, 76 of steering head 14 such that the outer surfaces of the housing of the steering head 14 and of the legs 60, 62 are aligned with each other without a step.

The invention claimed is:

1. A steering arm for a walking/rider pallet truck, the truck having a housing with an upper side and the steering arm having a steering rod which is linked to the upper side of the housing with one end, and carries a steering head at the other end, the steering head including actuation elements for the control of functions of the pallet truck, the steering rod having an upper surface and lateral surfaces which join to the upper surface, at least the lateral surfaces being covered by a cushion.

2. The steering arm of claim 1, wherein the cushion is formed by a layer of foamed plastic which is sprayed onto the steering rod.

3. The steering arm of claim 1, wherein separately shaped cushion portions are attached to surfaces of the steering rod.

4. The steering arm of claim 1, wherein an integrally shaped cushion portion is attached to the steering rod.

5. The steering arm of claim 4, wherein the steering rod is at least one of rectangular and U-shaped in cross section and the cushion portion is at least one of U and C-shaped in cross section and grips over the steering rod from above, and fastening means are provided to fasten the at least one of U and C-shaped cushion portion to the steering rod.

6. The steering arm of claim 5, wherein portions of the C-shaped cushion portion which engage the lower side of the steering rod have a groove at the inner side which extends parallel to the longitudinal axis of the cushion portion, and free edges of the leg portions of the U-shaped rod engage the grooves.

7. The steering arm of the claim 5, wherein a cover plate is provided at the lower side of the steering rod, the cover plate engaging the outer surfaces of the portions of the C-shaped cushion portion which undergrip the steering rod, and the cover plate being fastened to the web portion of the U-shaped steering rod by threaded connections.

8. The steering arm of claim 5, wherein the lower end of the steering rod has a bearing portion which extends upwardly beyond the upper surface of the steering rod, and the lower end of the cushion portion has a support portion which engages the bearing portion.

9. The steering arm of claim 5, wherein the steering head on opposing sides of the steering rod has front head surfaces, and the cushion portion at the upper end has two legs which extend transverse to the longitudinal portion of the cushion portion and engage the associated front head surfaces.

10. The steering arm of claim 9, wherein the outer surfaces of the legs of the cushion portion are adapted to the contour of the steering head and are aligned with adjacent surfaces of the steering head.

11. The steering arm of claim 9, wherein the steering head has an upper and a lower cup with lower and upper edge portions, and the legs have grooves which accommodate the edge portions of the cup portions if the cups are attached to each other in order to secure the legs of the cushion portion to the steering head.

\* \* \* \* \*